J. G. KRAFT.
VEHICLE INDICATOR.
APPLICATION FILED FEB. 19, 1913.
1,086,539.
Patented Feb. 10, 1914.
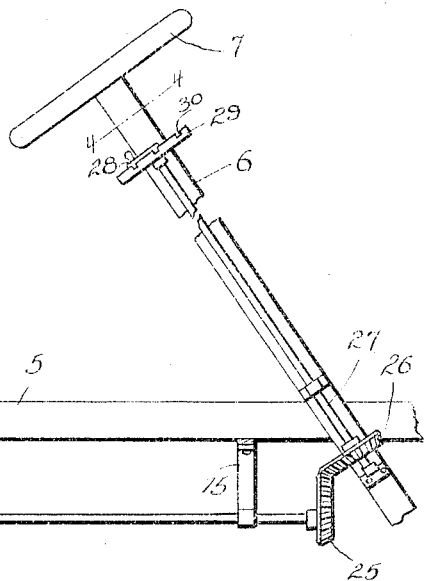
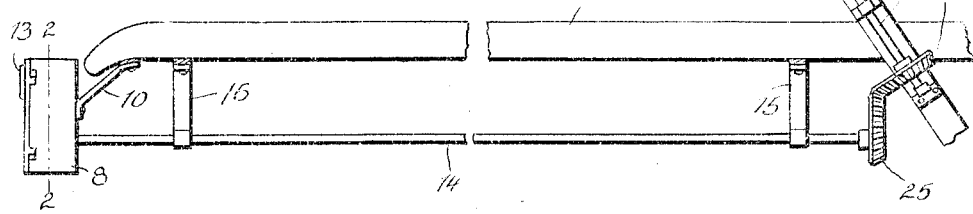
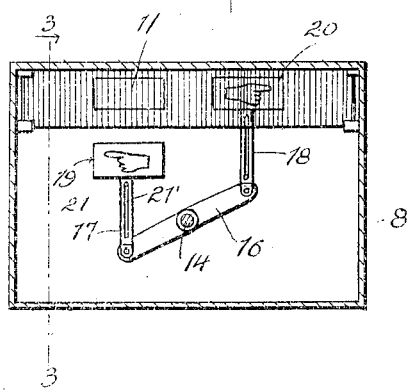
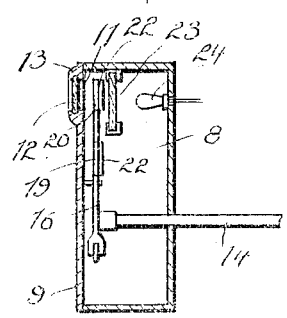
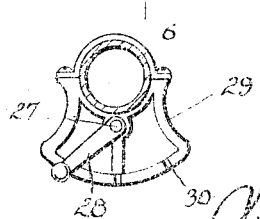
WITNESSES:
INVENTOR
J. G. Kraft
BY
ATTORNEY

UNITED STATES PATENT OFFICE.

JOHN G. KRAFT, OF SCRANTON, PENNSYLVANIA.

VEHICLE-INDICATOR.

1,086,539. Specification of Letters Patent. Patented Feb. 10, 1914.

Application filed February 19, 1913. Serial No. 749,465.

*To all whom it may concern:*

Be it known that I, JOHN G. KRAFT, a citizen of the United States, residing at Scranton, in the county of Lackawanna and State of Pennsylvania, have invented certain new and useful Improvements in Vehicle-Indicators; and I do hereby declare the following to be a full, clear, and exact description of the invention, such as will enable others skilled in the art to which it appertains to make and use the same.

This invention comprehends improvements in vehicle indicators and relates more particularly to those which may be operated from the driver's seat to indicate in which direction a turn is going to be made.

The primary object of the invention resides in the provision of a device of this nature, which shall be of extremely simple construction, cheap to manufacture, and simple to operate.

Another and more specific object of the invention is to provide an indicator including a casing having sight openings therein, a pair of indicating plates adapted to be alternately moved before said openings, and means operated from the driver's seat for moving said plates so as to indicate whether the vehicle is going to turn to the right or left.

The invention also aims to generally improve devices of this nature, to render them more useful, reliable, and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation of a vehicle indicator constructed in accordance with my invention, the same being shown attached to a vehicle frame. Fig. 2 is a view taken on the plane of line 2—2 of Fig. 1, Fig. 3 is a view taken on the plane of line 3—3 of Fig. 2, and, Fig. 4 is a view taken on the plane of line 4—4 of Fig. 1.

Referring in detail to the drawings by numerals, 5 designates a portion of a motor vehicle frame, 6 the steering rod, and 7 the steering wheel. A casing, generally designated 8, and having a hingedly secured rear wall 9, is secured to the rear of the vehicle frame by any suitable means, such as the braces 10. The wall 9 is formed with a pair of sight openings 11 for a purpose to be hereinafter described, and a plain glass plate 12 is secured in the rear of the openings by means of the flanges 13.

A shaft 14 is journaled through hangers 15 secured at suitable positions on the frame 5, and projects into the casing 8. A cross bar 16 is secured to the shaft within the casing 8 and has pivotally connected to its extremities the arms 17 and 18. These arms are bifurcated, as shown in Fig. 3 to provide means whereby they may be pivotally connected to said cross bar in a convenient manner. Indicating plates 19 and 20 are rigidly secured to the upper ends of the arms 17 and 18, respectively, and have suitable direction indicating symbols stamped therein, such as the oppositely pointing hands, clearly shown in Fig. 2. Guide pins 21 are secured to the rear wall of the casing and support the arms 17 and 18 in an approximately vertical position. These pins project rearwardly through longitudinal slots 21' formed in the arms 17 and 18, as clearly shown in Fig. 2. A sheet 22 of suitable translucent material is secured to the rear side of each of the indicating plates so as to cover the indicating openings stamped therein and make the same clearly visible in daylight. A colored glass plate 23 is secured to the top wall of the casing to the rear of the indicating plates and a suitable light, indicated 24, may be secured within the casing so as to shine through the colored glass plate and the translucent sheets, whereby the indicating characters will be clearly visible at night.

An arcuate bevel gear 25 is rigidly secured to the forward end of the shaft 14 and meshes with a similar gear 26 which latter is secured to the lower end of a rod 27. The rod extends upwardly parallel to the steering shaft 6 and has an operating arm 28 secured to its upper extremity. The arm rides over a segmental bracket 29 which is formed with three notches 30 in which the arm is adapted to seat. When the vehicle is moving in a straight line and a turn is not contemplated the arm 28 is in engagement with the middle notch 30, at which time the direction indicating plates 19 and 20 are level with each other and are below the openings 11 and therefore are invisible.

When a turn is going to be made to the right, the arm 28 is moved from the middle notch to the rear notch 30, whereby the rod 27 is rotated so as to actuate the rod 14. The movement of the latter causes the cross piece 16 to project the plate 20 upwardly so that an indicating character stamped therein may be visible through the corresponding slot 11, as is shown in Fig. 2. When a turn is contemplated to the left the arm 28 is moved to the forward notch and a corresponding movement of the direction plates is produced.

From the foregoing description taken in connection with the accompanying drawings, it will be seen that I have provided an extremely simple direction indicator, which may be applied to all of the common types of motor vehicles now in use, which may be easily seen either during the night or day and which may be conveniently operated by the driver of the vehicle, whereby many collisions and accidents will be avoided.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

A vehicle indicator comprising a casing designed to be supported at the rear end of a vehicle, said casing having sight-openings disposed side by side in the rear wall thereof, a rotatable rod projecting into said casing, a cross-arm secured to said rod within the casing, a slotted arm pivoted to each end of said cross-arm, guide pins supported on the casing and extending through the slots of said arms, indicating plates secured to the ends of said slotted arms and having openings therein, a translucent sheet back of each indicating plate, a light, a colored glass plate interposed between each indicating plate and the light, and means for rotating said rod to move the indicator plates into and out of coincidence with the sight-openings.

In testimony whereof I affix my signature in presence of two witnesses.

JOHN G. KRAFT.

Witnesses:
    Jos. F. Conrad,
    Emil A. Herbster.